United States Patent Office 3,606,394
Patented Sept. 20, 1971

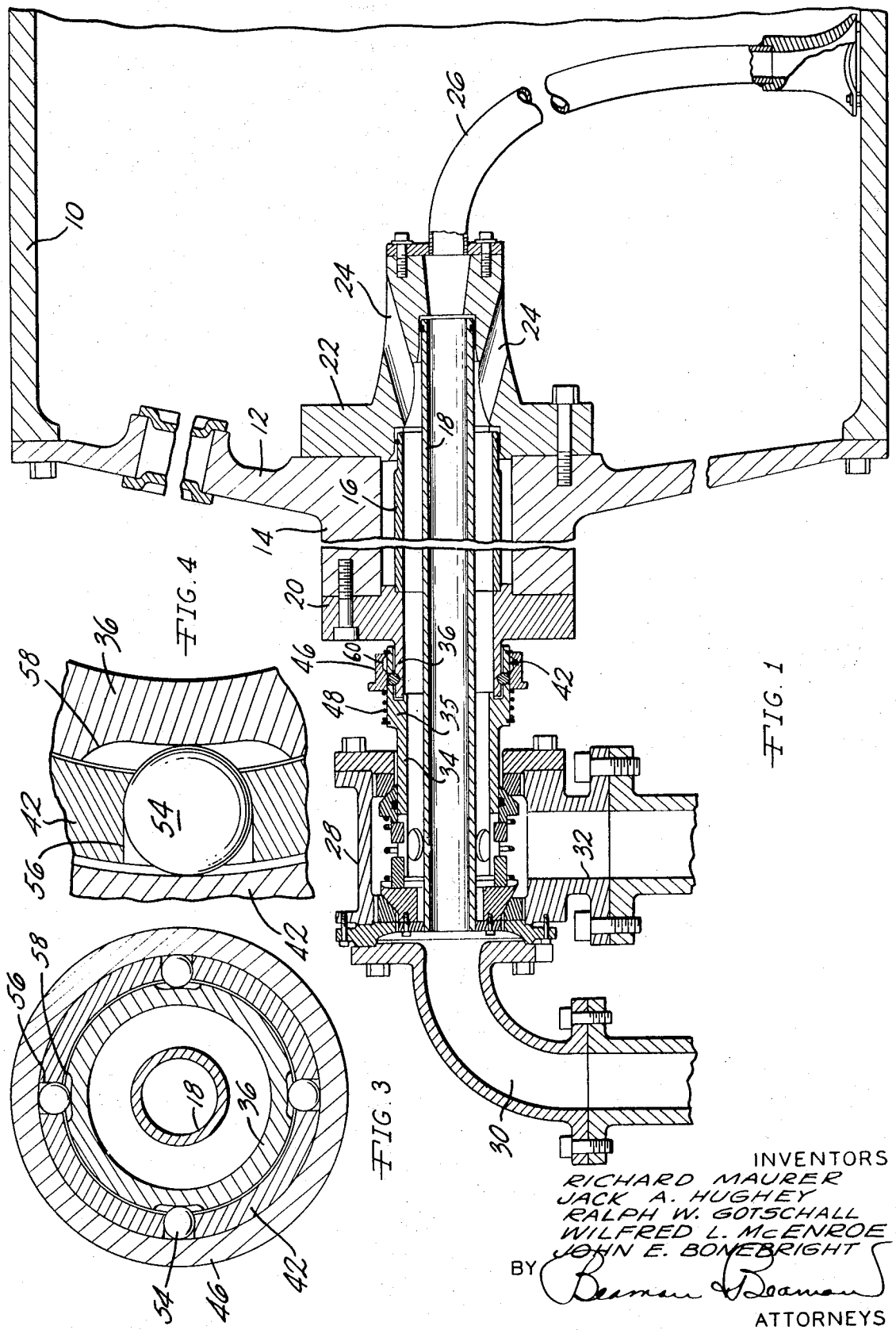

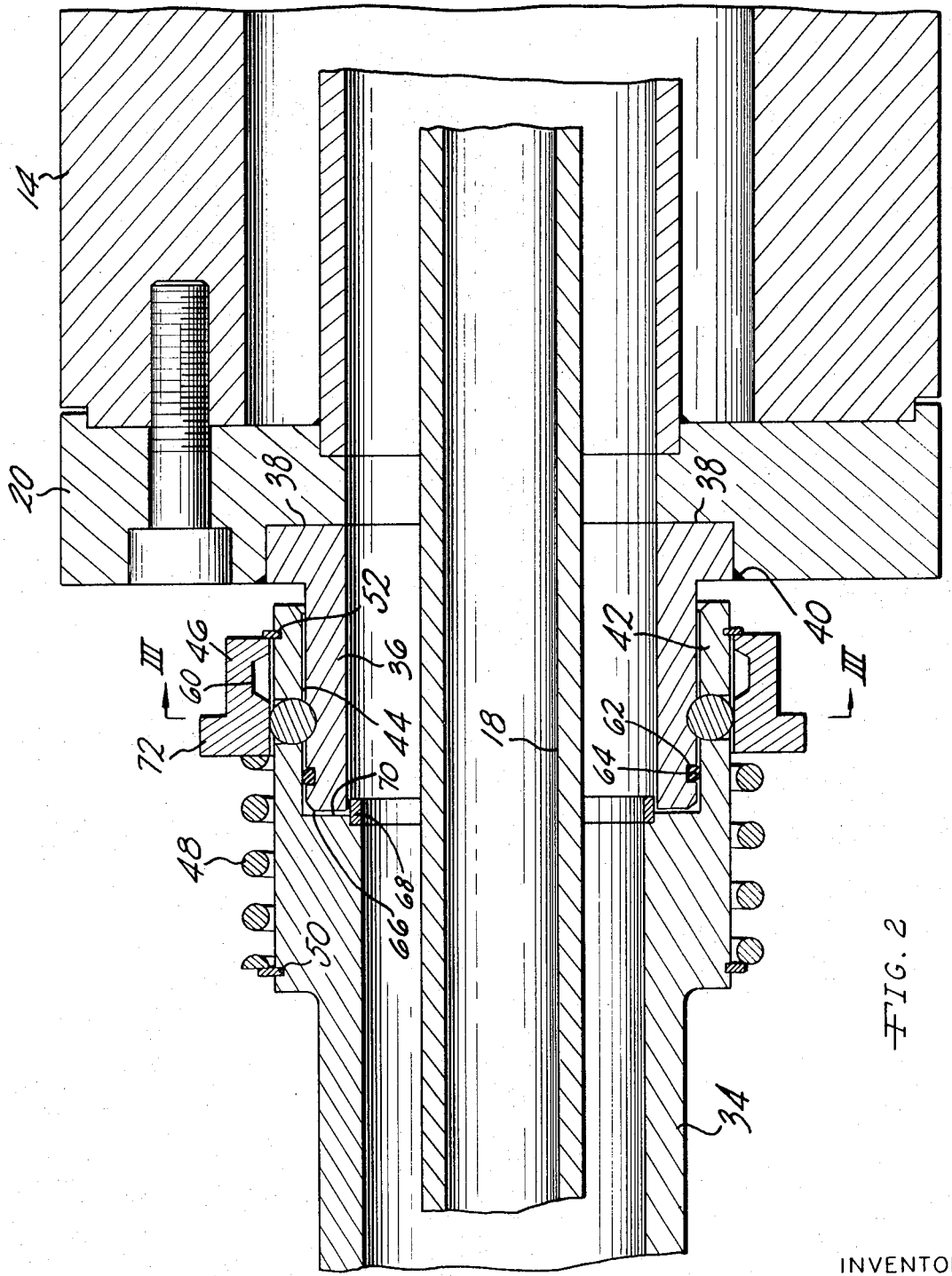

3,606,394
QUICK DISCONNECT JOINT
Richard Maurer, Three Rivers, Jack A. Hughey, Moore Park, and Ralph W. Gotschall, Wilfred L. McEnroe, and John E. Bonebright, Three Rivers, Mich., assignors to The Johnson Corporation, Three Rivers, Mich.
Filed June 12, 1969, Ser. No. 832,786
Int. Cl. F16l 39/04
U.S. Cl. 285—134   1 Claim

ABSTRACT OF THE DISCLOSURE

Adaptor structure for rotary pressure joint for communicating a rotating cylinder of a paper dryer, or the like, with a fluid source, the joint having a nipple driven by the dryer, there being means for connecting and disconnecting the driven nipple without interruption of the rotation of the dryer to effect joint repair and replacement.

BACKGROUND OF THE INVENTION

In the manufacture of sheet material such as paper, the paper mill, or the like, is usually run continuously pending a major breakdown with normal shutdown periods for repair and maintenance being as infrequent as possible, such as week-ends or even as infrequently as once a year. Rotary joints are used to communicate the interior of the dryers of paper mills with a fluid source, such as a steam generator. A component of the joint is connected to and rotated with the dryer with resulting wear of sealing surfaces of the joint ultimately requiring repair and replacement of the joint to avoid fluid leakage. As it is not practical to shut down the entire mill to repair a single joint, it is the general practice to merely shut off the fluid flow between the fluid source and the joint and, thus, interrupt the normal function of the dryer, although the dryer continues to rotate and convey the sheet material. Under such conditions the repair or replacement of the defective joint is then delayed until the mill is shut down for normal repairs and maintenance.

In joints of the type described in the preceding paragraph and as disclosed in U.S. Pat. No. 2,166,245, it has not been found practical to attempt to repair or replace this type of joint in service with the dryer journal rotating.

SUMMARY OF THE INVENTION

In carrying out the present invention the rotated nipple of the rotary joint has been adapted to quick connect and disconnect association with a special extension of the journal flange assembly of the dryer. As illustrated, the normal drive connection between the nipple of the rotary joint and the journal extension is accomplished through a plurality of ball detents held in their driving position by an embracing sleeve. Upon axial displacement of the sleeve, the ball detents are radially displaced to enable the nipple and its joint to be separated from the extension on the journal flange with the dryer rotating by manually effecting relative axial movement. Following repair or replacement of the rotary joint the nipple thereof may be connected to the extension of the journal flange by reversing the disconnection procedure previously described.

BRIEF DESCRIPTION OF THE DRAWINGS

FIG. 1 is a fragmentary longitudinal cross-sectional view of a rotary joint and dryer equipped with adaptor structure for accomplishing quick connection and disconnection, FIG. 2 is an enlarged fragmentary view of a portion of FIG. 1, FIG. 3 is a cross-sectional view of the adaptor nipple extension and journal flange extension taken on line III—III of FIG. 2, and FIG. 4 is an enlarged view of a portion of FIG. 3 showing the ball detent drive.

DESCRIPTION OF THE PREFERRED EMBODIMENT

The environment of the invention, as illustrated in FIG. 1, is such that the steam heated dryer cylinder 10 has a head end 12 defining a hollow journal 14 through which steam is admitted. An insulating sleeve 16, embracing the condensate discharge conduit 18, conducts the entering steam between the journal flange 20 and the internal syphon support spider 22 for discharging the steam into the interior of the dryer cylinder 10 through ports 24. A rotary syphon 26, supported by the spider 22, connects with one end of the conduit 18 to remove the condensed steam from the cylinder 10.

Conduit 18 extends through the rotary pressure joint 28 and connects with the condensate discharge pipe 30. Steam is admitted to the rotary pressure joint 28 through the inlet connector 32 and thence to the sleeve 16 by the extension 34 of the rotary nipple 35 and the male end 36 of the journal flange 20.

ADAPTOR STRUCTURE

As more clearly shown in FIG. 2, the male end 36 of the journal flange 20 is piloted in a counterbore 38 of the flange 20 and welded at 40. The nipple 35 has been modified from the design used in prior practice by providing an extension 34 having a stepped outer end 42 with a counterbore 44 in which the male end 36 has a sliding fit. A locking and release collar 46 has a free sliding fit on the end 42, being normally retained in the position shown by a spring 48 reacting against a snap ring stop 50 and abutting against one end face of the collar 46 with the other end face abutting the snap ring stop 52. The quick releasable clutch mechanism between the telescoping ends 36 and 42 comprises a plurality of clutch balls supported for radial movement in radial holes 56 in the end 42 of the nipple extension 34. A plurality of circumferentially spaced depressions 58 are provided in the exterior surface of the male end 36, the spacing and number of depressions 58 corresponding to that of the holes 56 in the end 42. In practice, the holes 56 are not completely drilled through with the result that the balls 54 which have a close but free sliding fit in the holes 56 partly project through the bottom of the holes 56 yet are constrained against falling through the holes 56 when the end 42 is removed from the end 36.

Depressions 58 are preferably of greater circumferential length than the diameter of the balls 54 to facilitate the location of the balls 54 in the depressions 58 at the time the ends 36 and 42 are coupled.

Collar 46 is provided with a circumferential groove 60 into which the balls 54 may be radially projected by relative axial movement between the ends 36 and 42 with the collar 46 displaced against tension of the spring 48 to dispose the groove 60 in the radial plane of the balls 54, the depth of the groove 60 being sufficient to enable the balls 54 to be fully projected from the depressions 58 to interrupt the drive connection between the ends 36 and 42 provided by the balls 54.

To prevent leakage of steam pressure between the ends 36 and 42, a groove 62 is provided in the end 36 to receive an O-ring 64. Also, to reduce turbulence at the outer radial face of the end 36, a counterbore 66 is provided in the nipple extension 34 and a ring 68 inserted therein which axially projects beyond the radial face 70.

It will be understood that with the balls 54 engaged with the walls of the depressions 58 that relative axial movement, as well as relative rotational movement between the ends 36 and 42, is prevented. At the same time, a maintenance man may engage the flange 72 on the collar 46 with his fingers with the dryer 10 rotating and by moving the collar 46 axially relative to the stop 52 to align the balls 54 with the groove 60, bodily relative movement thereafter between the ends 36 and 42 will project the balls 54 radially outwardly from locking engagement with the depressions 58, and the rotary pressure joint 28 may be bodily removed from the male end 42 of the journal flange 20 of the dryer 10. Following repair or replacement of the rotary pressure joint 28, with the dryer 10 still rotating, the joint may be reengaged on the male end 42 by reversing the disconnecting procedure above outlined.

No special tools are required to connect or disconnect the rotary pressure joint 28 with reference to the journal 14. By having the outer surface of the ring 56 free of projections, the ring 46, notwithstanding the fact that it may be rapidly rotating, may be gripped by the fingers and axially displaced. Rotary joints presently in service may be converted over to the present invention by modifying or replacing the driven nipple structure of the rotary joint and by providing the dryer, or other apparatus, with a journal flange having the male end 42. Also, it is to be understood that the reversal of the telescoping arrangement between the ends 36 and 42 and the associated clutch mechanism is anticipated.

We claim:
1. A quick connect and disconnect fluid conduit coupling adaptor structure for effecting a combination drive and conduit coupling between a rotatable dryer cylinder, or the like, having a hollow journal and a rotary pressure joint of the type having a rotatable nipple sealed in the joint and driven by the cylinder, said structure comprising an axial extension for said nipple having an outer end with a cylindrical exterior surface and a counterbore, said journal having a hollow male extension disposed within said counterbore, a radially disposed hole defined in said nipple extension with one end thereof opening through said exterior surface and the other end opening into said counterbore, a locking detent in said hole for radial movement in opposite directions for clutching and declutching said extensions to and from each other, said detent having a radial dimension in excess of the wall thickness of said outer end, a first depression defined in the exterior surface of said male extension in one radial plane into which a portion of said detent is projected upon radial movement of the said detent in one direction to clutch said extensions against relative axial and rotational movements, a manually actuated annular member closely fitted on said cylindrical surface for relative axial sliding movement thereon and for rotational movement therewith, said annular member in a first position restraining said detent against outward radial movement from said first depression to hold said extensions in clutched relationship, a second depression defined in said interior surface of said annular member and disposed in a second radial plane to provide radial clearance for the outward radial movement of said detent from its association with said first depression to declutch said extensions with said first and second radial planes aligned in a common plane, continually acting means for normally disposing said annular member in said first position with said raidal planes in offset relation and said extensions in clutched relationship, said continually acting means being manually shiftable to permit said annular member to slide on said nipple extension to a position aligning said radial planes to declutch said extensions whereby to permit relative axial movement between said extensions with said cylinder rotating.

References Cited
UNITED STATES PATENTS

| | | | |
|---|---|---|---|
| 2,166,245 | 7/1939 | Goff et al. | 34—125 |
| 2,290,215 | 7/1942 | Stenberg | 287—ball detent |
| 3,265,408 | 8/1966 | Dickie | 285—316X |

DAVE W. AROLA, Primary Examiner

U.S. Cl. X.R.

285—316